United States Patent [19]

Lundin

[11] Patent Number: 4,618,424
[45] Date of Patent: Oct. 21, 1986

[54] ROTARY VACUUM FILTER WITH ADJUSTABLE IMMERSION ANGLE

[76] Inventor: Ingvar Lundin, Stora Herrestad 75:2, 271 00 Ystad, Sweden

[21] Appl. No.: 506,996

[22] Filed: Jun. 23, 1983

[30] Foreign Application Priority Data

Jul. 7, 1982 [SE] Sweden ................................ 8204212

[51] Int. Cl.⁴ ............................................. B01D 33/06
[52] U.S. Cl. .................................... 210/396; 210/402; 210/405; 210/421
[58] Field of Search ............... 210/784, 396, 399, 402, 210/405, 420, 421, 403, 404; 162/329

[56] References Cited

U.S. PATENT DOCUMENTS

| | | | |
|---|---|---|---|
| 3,021,899 | 2/1962 | Goldsmith | 162/329 |
| 3,869,389 | 3/1975 | Rokitansky | 210/396 |
| 3,919,088 | 11/1975 | Doncer et al. | 210/402 |

FOREIGN PATENT DOCUMENTS 1279562 10/1968 Fed. Rep. of Germany ...... 210/402
82/00418 2/1982 PCT Int'l Appl. .

Primary Examiner—Richard V. Fisher
Assistant Examiner—Wanda L. Millard
Attorney, Agent, or Firm—Nies, Webner, Kurz & Bergert

[57] ABSTRACT

Rotary vacuum filter for filtering a suspension of, for example, yeast or some other plant cell material, comprising a drum (1), a trough (3) for the suspension positioned under the drum and a doctor knife (5) for removing the filter cake which is produced. The doctor knife is attached to or adjacent to one of the upper edges (6) of the trough (3).

According to the invention the trough (3) can be revolved around the geometric axis (10) of the drum (1), whereby the immersion angle ($\alpha$) is infinitely adjustable, and the doctor knife (5) can be moved towards and away from the center of the drum (1).

4 Claims, 3 Drawing Figures

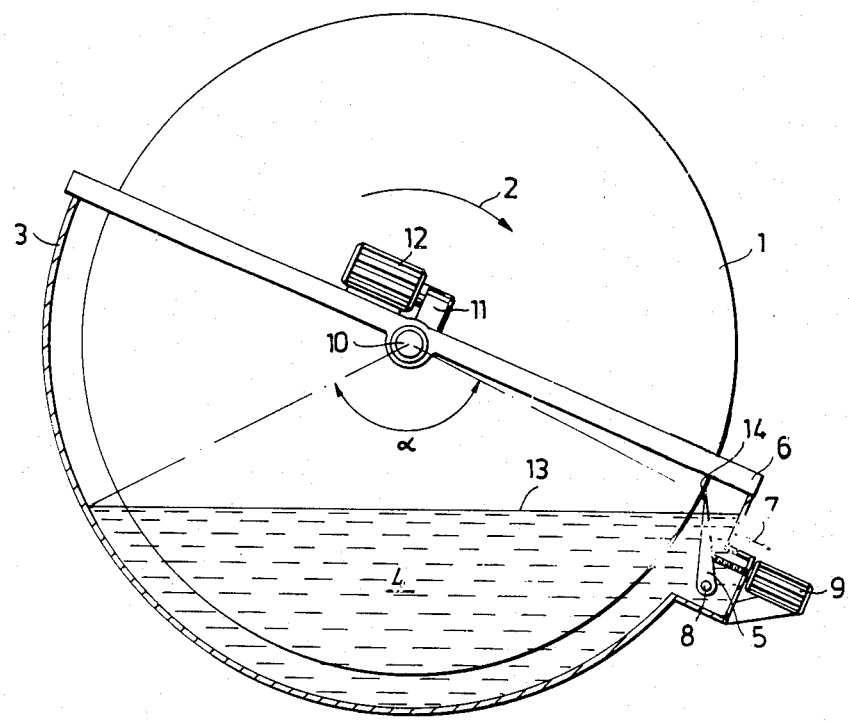
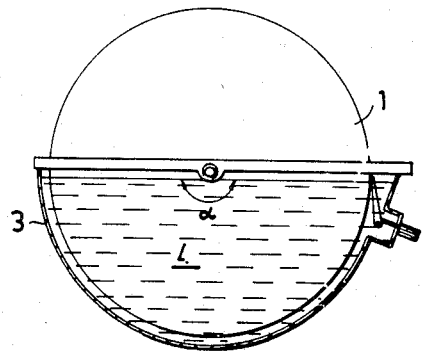
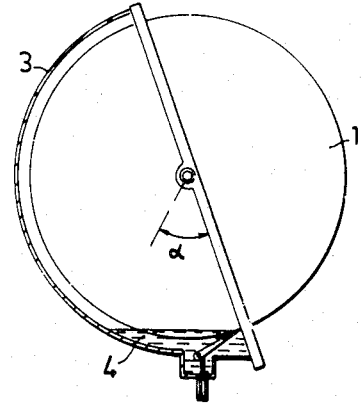

ROTARY VACUUM FILTER WITH ADJUSTABLE IMMERSION ANGLE

The present invention relates to a rotary vacuum filter. When filtering by means of a rotary vacuum filter the filter drum is pre-coated with a layer of filtering aid. The product to be filtered is available in the form of a suspension in a trough into which the filter drum is partly immersed. By varying the amount of suspension in the trough the immersion angle of the drum may be varied.

Filtration occurs thanks to the lower pressure inside the drum which extracts the liquid from the suspension, which is applied to the drum by immersing the drum in the trough. The filter cake remaining after the liquid has been evacuated is removed by using a doctor knife. The doctor knife is firmly attached and adjustable at the desired distance from the periphery of the drum.

When filtering different suspensions, different immersion angles and different speeds of rotation of the drum are required.

When filtering, optimal conditions are obtained when the immersion angle is such that an adequate amount of suspension is applied to the drum while the filter cake is sufficiently dry at the point of contact of the doctor knife. The optimal immersion angle varies considerably for different suspensions and it is thus advantageous to be able to alter this angle.

For this reason it has previously been suggested that the doctor knife should be fixed at one of several positions along the trough, each position corresponding to a certain immersion angle. However, this procedure only allows a certain number of different positions for the doctor knife, thus limiting the number of immersion angles that can be used. When filtering, it is preferable to use the total rotation of the drum by placing the doctor knife immediately above the level of the suspension in the trough.

It has been shown that in most cases it is highly advantageous to change the immersion angle during operation in order to adjust it to the optimal immersion angle for each suspension.

The present invention provides a device whereby the immersion angle can be made infinitely variable.

The present invention thus relates to a rotary vacuum filter for filtrating a suspension of, for example, yeast or some other plant cell material, comprising a drum, a trough for the suspension positioned under the drum, and a doctor knife for removing a filter cake produced by filtration, the doctor knife being fixed to or adjacent to the upper edge of the trough and characterized in that the trough can be revolved around the geometric axis of the drum, the immersion angle thus being infinitely adjustable, and in that the doctor knife can be moved towards and away from the center of the drum.

The invention will now be described with reference to the attached drawing showing one embodiment of the invention, where FIG. 1 shows a schematic side view of a device according to the invention, the trough 3 being placed at a certain angle in relation to the horizontal plane.

FIGS. 2 and 3 show, as examples, the trough in two further positions in relation to the horizontal plane.

FIG. 1 shows schematically a rotary vacuum filter for filtering a suspension of, for example, yeast or some other plant cell material, comprising a drum 1, which can be rotated in the direction of the arrow 2, and a trough 3 positioned under the drum 1. In FIGS. 1, 2 and 3 the end of the trough 3, which is nearest to the viewer, is removed for the sake of clarity.

The trough contains the suspension 4 that is to be filtered.

A doctor knife 5 for removing a filter cake produced by filtration is placed at or adjacent to the top of one of the sides of the trough 3. The doctor knife 5 can be moved towards and away from the center of the drum 1 as the arrow 7 indicates. The doctor knife 5 can preferably be revolved around an axis 8 by means of a device, e.g. a step motor 9, a manually turned wheel or the like.

The trough 3 can be revolved around the geometric axis of the drum 1, whereby the immersion angle, represented by $\alpha$ in the figures, is adjustable. According to a preferred embodiment the trough 3 is mounted on axle 10 which is supported by or comprises the axle of the drum 1. According to at least one embodiment of the invention the bearing housing of the axle 10 is locked to prevent rotation and provided with cogs or the like, where the cogs are designed to intermesh with a gear 11, operated by an electric motor 12, to adjust the position of the trough 3 by revolving it in relation to the horizontal plane.

It is thus evident that the above-mentioned rotational position of the trough and the distance between the doctor knife and the periphery of the drum can be varied.

The trough 3 is constructed so that it encloses the drum along approximately 180° of its periphery.

According to a preferred embodiment of the invention the trough 3 can be revolved to an angle of about 55° to 75°, preferably 65° from a position where the upper edge 6 of the trough 3 is horizontal. See FIG. 2. In this way the immersion angle $\alpha$ can be varied from about 160° (see FIG. 2) to about 20°–30°. See FIG. 3. When filtering wine must, for example, an immersion angle of about angle of about 30° is common.

Thus this invention—apart from providing for the adjustment of an optimal immersion angle—makes it possible to use the device for filtering completely different suspensions which require completely different immersion angles. In contrast conventional filters are made for filtering a certain type of suspension and lose capacity when filtering another suspension.

When filtering, a suspension level is normally maintained in the trough 3 that is only just below the edge 14 of the doctor knife 5, by means of a conventional level-controlling device, not shown here.

As mentioned at the beginning of the specification the periphery of the drum 1 is coated with a layer of filter aid, a pre-coat. During filtration the suspension is picked up from the trough by the part of the periphery of the drum 1 that at that moment is immersed in the suspension. From the suspension that has been picked up liquid is then extracted from the moment the above-mentioned part leaves the suspension until the moment it reaches the doctor knife.

By means of the doctor knife the filter cake which is formed is removed together with a thin layer of the pre-coat. For this reason the edge 14 of the knife 5 should be moved slowly towards the center of the drum 1 during operation.

When utilizing the present invention the rotation angle of the trough 1 is adjusted to obtain an immersion angle $\alpha$ that is suitable for the suspension in question. Thereafter filtration commences and the amount of suspension liquid that is extracted per unit of time is measured. This amount is a measure of the efficiency of the filtration process, which is dependent on the immersion angle. With the guidance of the amount mentioned the immersion angle is then altered by turning the trough until an optimal immersion angle has been reached.

The present invention thus makes it possible to adjust the apparatus to the optimal immersion angle for each individual suspension.

Both the device by which the trough is revolved and the device by which the knife is adjusted and operated may of course be designed in other ways known to those skilled in the art without departing from the idea behind the invention.

The invention should thus not be regarded as limited to the above-mentioned embodiment but may be varied within the scope of the attached patent claims.

I claim:

1. Rotary vacuum filter for filtering a suspension of yeast or any other plant cell material, comprising a drum (1), a trough (3) for the suspension positioned under the drum, and a doctor knife (5) for removing a filter cake produced during the filtration, wherein the doctor knife is attached to said trough adjacent to one of the upper edges (6) of the trough, and wherein an axle (10), which coincides with the geometric axis of the drum (1), is provided for and supports the trough which is mounted so as to be rotatable around the axle (10), whereby the immersion angle ($\alpha$) is infinitely adjustable by said rotation, and so that the doctor knife (5) can be moved towards and away from the center of the drum (1).

2. Rotary vacuum filter according to claim 1, characterized in that the trough (3) can be revolved to an angle of approximately 55° to 75°, from a position where the upper edge (6) of the trough (3) is horizontal, whereby said immersion angle ($\alpha$) may be varied from approximately 160° to approximately 20°.

3. Rotary vacuum filter according to claim 1, characterized in that the trough (3) encloses the drum (1) along approximately 180° of its periphery.

4. Rotary vacuum filter according to claim 2, characterized in that the trough (3) encloses the drum (1) along approximately 180° of its periphery.

* * * * *